May 9, 1950     H. B. GRANT     2,506,718
DOLLY TYPE TRAILER HITCH
Filed Oct. 7, 1946
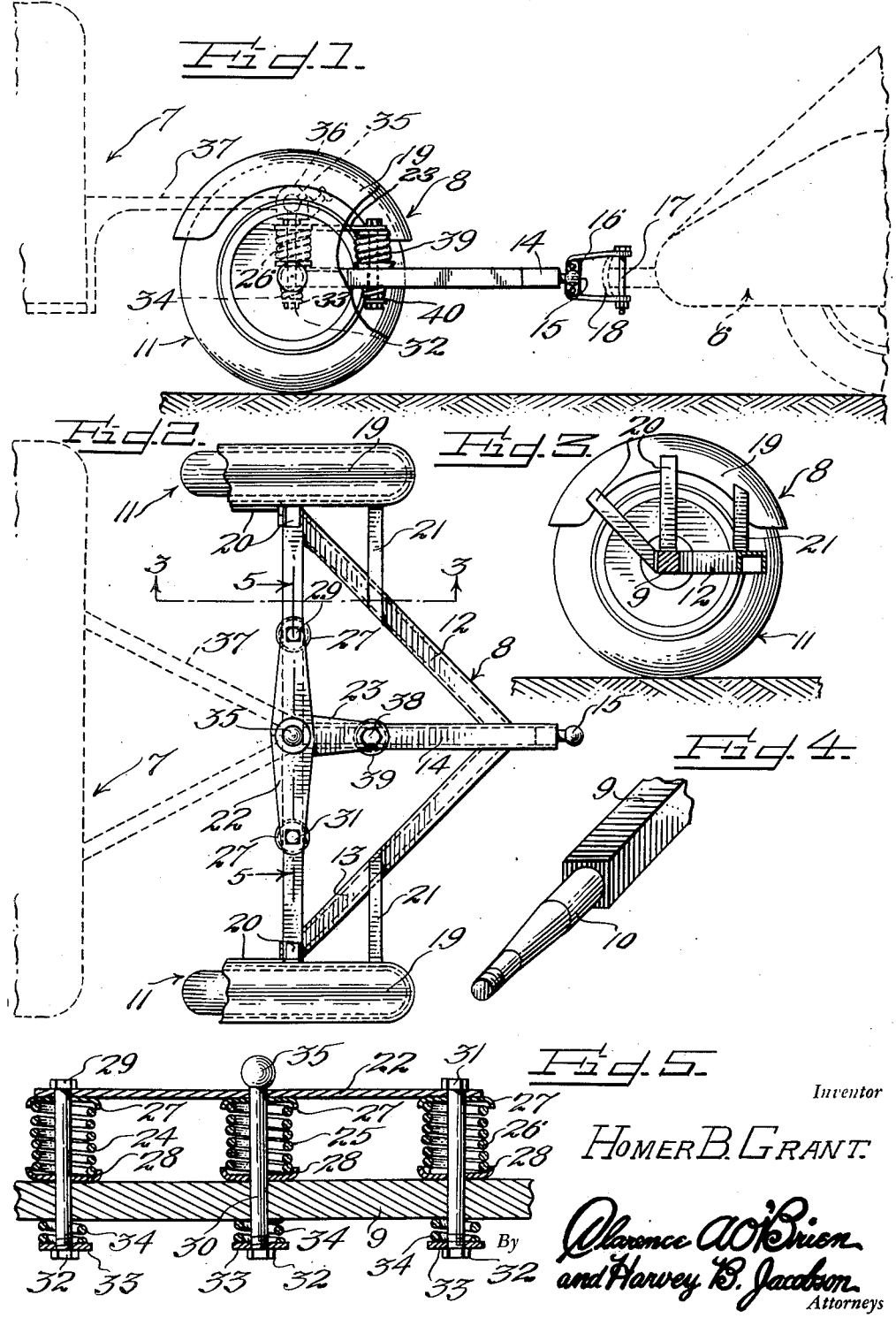
Inventor
HOMER B. GRANT Patented May 9, 1950

2,506,718

UNITED STATES PATENT OFFICE 2,506,718

DOLLY TYPE TRAILER HITCH

Homer B. Grant, St. Petersburg, Fla.

Application October 7, 1946, Serial No. 701,652

5 Claims. (Cl. 280—33.4)

The present invention relates to novel improvements in trailer hitches and has more particular reference to a two-wheeled dolly which is adapted to be interposed between and operatively connected with a pleasure car or an equivalent powering vehicle, and an accompanying trailer, said dolly being provided with readily adaptable facilities to expedite reliable connection of the dolly with the vehicle and trailer respectively.

More specifically, the invention appertains to a novel and improved dolly embodying a two-wheel supported axle and frame structure, said frame structure embodying a central longitudinal draw-bar, provided at its forward end with means for properly attaching same to the rear bumper of the powering vehicle, and said axle being provided with especially designed spring cushioned means to adequately and satisfactorily accommodate a suitable coupling on the trailer.

In carrying out the principles of the invention, I have evolved and produced novel hitch means in the form of the aforementioned dolly, the same being advantageous in that it saves wear and tear on the tires of the lead or powering vehicle, eliminates the necessity of employing booster spring means, promotes safe and fast road traction, and equalizes and balances the load in the trailer, in that it effectively "pulls" instead of "carrying" the load.

Another object of the invention has to do with a hitch of the aforementioned type which obviates the necessity of jacking up the trailer when inactive, said dolly serving as a temporary trailer truck after same has been unhitched from the lead vehicle.

In addition to more satisfactorily toting the trailer and insuring easier riding and driving of the lead vehicle, the trailer tracks with said lead vehicle. It is felt that this is important to the sportsman, driving on muddy or sandy roads, is advantageous to the casual trailer user, when pulling into a trailer camp or in any situation which calls for driving and handling a trailer on out-of-the-way and often difficult to travel roads.

Other objects, features and advantages of the invention will become more readily apparent from the following description and the accompanying illustrative drawings.

In the drawings, wherein like numerals are employed to designate like parts throughout the views:

Figure 1 is a side elevational view of a dolly or trailer hitch constructed in accordance with the principles of the present invention, showing the same in full lines and showing fragmentary portions in dotted lines, of the lead vehicle and trailer, all hitched together.

Figure 2 is a top plan view, of a fragmentary type, of the dolly, the trailer appearing in dotted lines.

Figure 3 is a sectional view taken on the plane of the line 3—3 of Figure 2, looking in the direction of the arrows.

Figure 4 is a fragmentary perspective view of one end portion of the dolly axle, and Figure 5 is an enlarged longitudinal sectional view, also fragmentary, taken on the plane of the line 5—5 of Figure 2, looking in the direction of the arrows.

In Figure 1 the lead or powering vehicle is denoted by the numeral 6, the trailer by the numeral 7 and the dolly-type hitch by the numeral 8.

Referring to the means 8, it will be seen that the axle thereof is denoted by the numeral 9, this being provided at its opposite outer ends with journals 10 to accommodate the rubber tired idling wheels 11. Said axle 9 is included in the frame means which embodies a substantially V-shaped forwardly extending frame unit made up of converging channel-irons 12 and 13, these being adjoined to the frontal end portions of the central longitudinal draft member 14. This is also a channel-iron and is connected at its rear end to the central portion of the axle and is provided on its forward end with a fitting embodying a ball jointing element or head 15, the latter having universal connection with a yoke or clevis 16 attached by a bolt or the like 17 to the rear bumper 18 of the lead vehicle 6. The wheels are provided with appropriate fenders 19 connected by strap braces 20 to the end portions of the axle and by additional strap members 21 to the frame members 12 and 13. The fenders constitute, obviously, optional equipment.

I next call attention to the substantially T-shaped adapter comprising a plate-head 22 situated in spaced parallelism above the axle, and a forwardly extending stem portion 23 situated above the draft bar 14. Reference being had to Figure 5, it will be seen that coiled cushioning and compensating springs 24, 25 and 26 are interposed between the end and intermediate portions of said T-adapter, said adapter having spring cups 27 to accommodate the upper ends of the springs, and said axle being provided with similar spring cups 28 to accommodate the lower ends of said springs. Assembling and retaining bolts 29, 30 and 31 are provided and the shank portions of the bolts extend downwardly through apertures in the plate 22, through the cups and springs and through bolt holes provided therefor in the axle. The lower ends of the respective bolts are provided with nuts 32, securing washers 33, said washers having interposed therebetween, auxiliary coil springs 34. These are shock absorbers and take care of rebounds and are interposed between said washers and the underside of said axle as shown. The upper end of the intermediate or central bolt 30 is formed into a ball attaching head 35 to accommodate the customary socket 36 on the draft means 37 of the trailer. Thus, the trailer is centrally attached to the dolly by way of the bolt 30, head 35 and accompanying parts which go to make up the T-adapter. I also find it desirable to secure the stem 23 of the adapter to the draft bar 14 by way of a bolt 38 provided with a cushioning spring 39 and shock absorbing and rebound spring 40, the latter appearing in dotted lines in Figure 1.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a trailer pulling dolly of the class described a wheel-supported frame including an axle and a draw-bar rigidly attached to and projecting forwardly from said axle, a horizontally disposed T-shaped adapter plate having portions disposed vertically above and substantially parallel to the axle and draw-bar, bolts extending through said portions of the adapter, axle and draw-bar respectively, and a plurality of coiled springs surrounding the respective bolts and interposed between the adapter, axle, and drawbar.

2. In a trailer pulling dolly of the class described a wheel-supported frame including an axle and a draw-bar, a horizontally disposed T-shaped adapter plate having plate portions disposed vertically above and substantially paralled to the axle and draw-bar, bolts extending through the plate portions of the adapter, axle, and draw-bar respectively, and a plurality of coiled springs surrounding the respective bolts and interposed between the adapter, axle, and draw-bar, said bolts extending downwardly through and beyond the axle and draw-bar, and rebound and shock absorbing springs surrounding the lower end portions of the respective bolts and interposed between the bolt fastening elements and axle and draw-bar respectively.

3. A heavy duty dolly for pulling a trailer comprising a wheel-supported frame including an axle with supporting wheels and a braced draw bar connected centrally to and projecting forwardly from the axle and adapted at its forward end to be hitched to a powering vehicle, an adapter having portions disposed in parallelism above the central portion of said axle and an adjacent coacting portion of said drawbar, said adapter having spaced bolt holes and being provided on its underside with spring cups having openings lined up with the bolt holes, said axle and drawbar having bolt holes lined up with the first named bolt holes, additional spring cups mounted on said axle and draw bar, located beneath and lined up with the respective firstnamed spring cups, bolts having their shank portions passing downwardly through the respective bolt holes in the adapter, drawbar and axle, said bolts having heads disposed above the top of said adapter, individual coiled cushioning springs, a spring surrounding each bolt the end portions of the respective springs being seated in the respective first and second named spring cups, the lower ends of the shanks of said bolts being provided with assembling and retaining nuts, and a coiled rebound spring surrounding the lower nut-equipped end of each bolt and interposed between the nut and the undersides of the axle and drawbar respectively.

4. A trailer pulling heavy-duty dolly comprising a two-wheel supported axle, a drawbar connected to and extending at right angles from the intermediate portion of said axle and located in a plane with the axle, brace means between and connected with the drawbar and end portions of the axle, a T-shaped adapter unit having complemental plate portions situated in a plane above and parallel to said axle and drawbar respectively, hitching means on the forward end of said drawbar whereby the latter may be connected with a powering vehicle, coupling means carried by said axle whereby a trailer may be connected with said axle, coiled cushioning springs interposed between the adapter and the axle and between the adapter and drawbar, and bolts extending through the springs and operatively joined with said axle, adapter and drawbar.

5. The structure specified in claim 4, together with a plurality of coiled rebound springs counteracting said first named springs, said rebound springs being mechanically connected to the axle and drawbar by way of said bolts.

HOMER B. GRANT.

REFERENCES CITED

The following references are of record in the file of this patent:

UNITED STATES PATENTS

| Number | Name | Date |
| --- | --- | --- |
| 1,265,705 | Litchfield | May 7, 1918 |
| 1,600,635 | Isachsen | Sept. 21, 1926 |
| 2,381,190 | Tiner et al. | Aug. 7, 1945 |